United States Patent
Zhu et al.

(10) Patent No.: US 11,457,331 B2
(45) Date of Patent: Sep. 27, 2022

(54) POSITIONING METHOD AND RELATED DEVICE

(71) Applicant: Huawei Technologies Co., Ltd., Shenzhen (CN)

(72) Inventors: Haoren Zhu, Shanghai (CN); Hualin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/067,342

(22) Filed: Oct. 9, 2020

(65) Prior Publication Data

US 2021/0029509 A1 Jan. 28, 2021

Related U.S. Application Data

(63) Continuation of application No. PCT/CN2019/081858, filed on Apr. 9, 2019.

(30) Foreign Application Priority Data

Apr. 9, 2018 (CN) .......................... 201810318534.7

(51) Int. Cl.
*H04W 4/029* (2018.01)
*H04W 8/08* (2009.01)
*H04W 84/12* (2009.01)

(52) U.S. Cl.
CPC ............. *H04W 4/029* (2018.02); *H04W 8/08* (2013.01); *H04W 84/12* (2013.01)

(58) Field of Classification Search
CPC ....... H04W 64/00; H04W 4/029; H04W 4/02; H04W 88/06; H04W 36/0022;

(Continued)

(56) References Cited

U.S. PATENT DOCUMENTS 8,311,557 B2 * 11/2012 Annamalai ......... H04W 36/385
455/456.1
9,723,520 B1 * 8/2017 Sylvain ................. H04W 36/32
(Continued)

FOREIGN PATENT DOCUMENTS

CN 101325796 A 12/2008
CN 101801060 A 8/2010
(Continued)

OTHER PUBLICATIONS

3GPP TS 23.501 V15.1 0, "3rd Generation Partnership Project; Technical Specification Group Services and System Aspects; System Architecture for the 5G System; Stage 2 (Release 15)," Mar. 2018, 201 pages.

(Continued)

Primary Examiner — Matthew C Sams
(74) Attorney, Agent, or Firm — Conley Rose, P.C.

(57) ABSTRACT

A method includes determining, by a location management function (LMF) network element based on an access type of a terminal device, a positioning method for the terminal device and an access type for obtaining a positioning parameter, and sending, by the LMF network element, the positioning method and indication information to a mobility management network element, where the indication information indicates to the mobility management network element to obtain the positioning parameter using the access type.

20 Claims, 8 Drawing Sheets

(58) Field of Classification Search
CPC ..... H04W 36/14; H04W 36/385; H04W 4/20;
H04W 64/006; H04W 76/27; H04W 8/06;
H04W 84/12; H04W 12/03; H04W 12/04;
H04W 12/08; H04W 16/28; H04W 24/10;
H04W 28/20; H04W 28/22; H04W 4/90;
H04W 48/00; H04W 48/12; H04W 60/00;
H04W 60/06; H04W 64/003; H04W
68/00; H04W 68/02; H04W 76/10; H04W
76/11; H04W 76/12; H04W 76/15; H04W
76/28; H04W 8/10; H04W 8/22; H04W
8/24; H04W 80/02; H04W 80/10; H04W
84/042; H04W 88/085; H04W 88/14;
H04W 8/08; G01S 5/0263; G01S 5/0236;
G01S 1/00; G01S 1/0428; G01S 19/48;
G01S 5/00; G01S 5/0036; G01S 5/02;
G01S 5/0226; G01S 5/0242; G01S 5/10
See application file for complete search history.

(56) References Cited

U.S. PATENT DOCUMENTS

| | | | |
|---|---|---|---|
| 2010/0029248 A1 | 2/2010 | Shi et al. | |
| 2010/0291947 A1* | 11/2010 | Annamalai | H04W 4/029 455/456.1 |
| 2011/0053613 A1 | 3/2011 | Zhou et al. | |
| 2011/0098057 A1 | 4/2011 | Edge et al. | |
| 2011/0306355 A1 | 12/2011 | Wigren et al. | |
| 2012/0088518 A1* | 4/2012 | Edge | H04W 64/00 455/456.1 |
| 2012/0295623 A1 | 11/2012 | Siomina et al. | |
| 2015/0005006 A1 | 1/2015 | Wachter et al. | |
| 2015/0119075 A1* | 4/2015 | Thompson | G01S 19/48 455/456.1 |
| 2017/0123039 A1 | 5/2017 | Shin et al. | |
| 2017/0295529 A1* | 10/2017 | Kang | H04W 12/03 |
| 2018/0098279 A1 | 4/2018 | Edge | |
| 2018/0167983 A1* | 6/2018 | Salkintzis | H04W 76/15 |
| 2018/0199160 A1* | 7/2018 | Edge | H04W 4/02 |
| 2018/0343635 A1* | 11/2018 | Edge | H04W 88/18 |
| 2019/0007992 A1* | 1/2019 | Kim | H04W 64/006 |
| 2019/0037338 A1* | 1/2019 | Edge | H04W 64/00 |
| 2019/0037529 A1* | 1/2019 | Edge | H04W 16/28 |
| 2019/0053010 A1* | 2/2019 | Edge | H04W 64/00 |
| 2019/0141606 A1* | 5/2019 | Qiao | H04W 64/003 |
| 2019/0174449 A1* | 6/2019 | Shan | H04W 60/00 |
| 2019/0215729 A1* | 7/2019 | Oyman | H04L 65/80 |
| 2019/0230475 A1* | 7/2019 | Edge | H04W 4/029 |
| 2020/0037145 A1* | 1/2020 | Gunnarsson | H04W 4/06 |
| 2020/0367022 A1* | 11/2020 | Tenny | H04W 64/00 |
| 2021/0029603 A1* | 1/2021 | Kim | H04W 36/14 |
| 2021/0243678 A1* | 8/2021 | Drevon | H04W 48/02 |
| 2021/0360371 A1* | 11/2021 | Qiao | H04W 4/026 |

FOREIGN PATENT DOCUMENTS

| | | | |
|---|---|---|---|
| CN | 102006547 | A | 4/2011 |
| CN | 102257840 | A | 11/2011 |
| CN | 102742335 | A | 10/2012 |
| CN | 102858011 | A | 1/2013 |
| CN | 105991732 | A | 10/2016 |
| CN | 106465325 | A | 2/2017 |
| CN | 107390245 | A | 11/2017 |
| JP | 2013108959 | A | 6/2013 |
| RU | 2495544 | C2 | 10/2013 |
| RU | 2012138706 | A | 3/2014 |
| WO | 2010012174 | A1 | 2/2010 |
| WO | 2010088817 | A1 | 8/2010 |
| WO | 2016131221 | A1 | 8/2016 |
| WO | WO-2018199649 | A1 * | 11/2018 ............ H04W 28/16 |

OTHER PUBLICATIONS

3GPP TS 23.502 V15.1.0, "3rd Generation Partnership Project; Technical Specification Group Services and System Aspects; Procedures for the 5G System; Stage 2 (Release 15)," Mar. 2018, 285 pages.
3GPP TS 24.501 V1.0.0, "3rd Generation Partnership Project; Technical Specification Group Core Network and Terminals; Non-Access-Stratum (NAS) protocol for 5G System (5GS); Stage 3 (Release 15)," Mar. 2018, 253 pages.
3GPP TS 29.518 V1.0.0, (Mar. 2018), "3rd Generation Partnership Project; Technical Specification Group Core Network and Terminals; 5G System; Access and Mobility Management Services; Stage 3 (Release 15)," Mar. 2018, 94 pages.
3GPP TS 36.305 V14.3.0, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 14)," Sep. 2017, 78 pages.
3GPP TS 36.355 V14.5.1, "3rd Generation Partnership Project; Technical Specification Group Radio Access Network; Evolved Universal Terrestrial Radio Access (E-UTRA); LTE Positioning Protocol (LPP) (Release 14)," Apr. 2018, 171 pages.
3GPP TS 38.455 V0.6.0, "3rd Generation Partnership Project; Technical Specification Group Radio Access Network; NG-RAN; NR Positioning Protocol A (NRPPa) (Release 15)," Mar. 2018, 46 pages.
Qualcomm Incorporated "5G System Procedures for Location Support of Regulatory Services," SA WG2 Meeting #122-BIS, S2-175716, Aug. 21-35, 2017, Sophia Antipolis, FR, 22 pages.
Lenovo et al., "Key Issue: Non-3GPP access support for LCS," 3GPP TSG-SA WG2 Meeting #126, S2-182408, Montreal, Canada, Feb. 26-Mar. 2, 2018, 2 pages.
Nokia, et al., "Network Provided Location for non-3GPP access," SA WG2 Meeting #126, S2-181721, Feb. 26-Mar. 2, 2018, Montreal, Canada, 3 pages.
Huawei, et al., "Solution for enhancement to LCS architecture," SA WG2 Meeting #126, S2-182126, Feb. 26-Mar. 2, 2018, Montreal, Canada, 4 pages.
Nokia, et al., "Positioning Access Type Selection," 3GPP TSG-SA WG2 Meeting #131, S2-1901656, Feb. 25-Mar. 1, 2019, Tenerife, Spain, 6 pages.
Nokia, Nokia Shanghai Bell, Huawei, Positioning Access Type Selection, 3GPP TSG-SA WG2 Meeting #132, S2-1903272, Apr. 8-12, 2019, Xian, P.R.China, 6 pages.
Ericsson, "Key issues for eLCS on support NR positioning methods," SA WG2 Meeting #126, Feb. 26-Mar. 2, 2018, Montreal, Canada, S2-181933, 1 page.

* cited by examiner

POSITIONING METHOD AND RELATED DEVICE

CROSS-REFERENCE TO RELATED APPLICATION

This application is a continuation of International Patent Application No. PCT/CN2019/081858 filed on Apr. 9, 2019, which claims priority to Chinese Patent Application No. 201810318534.7 filed on Apr. 9, 2018. The disclosures of the aforementioned applications are hereby incorporated by reference in their entireties.

TECHNICAL FIELD

This application relates to the field of communications technologies, and in particular, to a positioning method and a related device.

BACKGROUND

A 5th-generation (5G) mobile communications technology standard defines positioning procedures applicable to different scenarios, including a Network Induced Location Request (NI-LR) procedure, a Mobile Terminated Location Request (MT-LR) procedure, a Mobile Originated Location Request (MO-LR) procedure, and the like.

Currently, the foregoing positioning procedures are mainly designed for a 3rd Generation Partnership Project (GPP) architecture in 5G. With advancement of the 5G standard, a non-3GPP (N3GPP) access architecture has been proposed. However, after the N3GPP access architecture is introduced, how to perform positioning is not provided in the other approaches.

SUMMARY

Embodiments of this application disclose a positioning method and a related device, to prevent a finally determined positioning method from being inapplicable to a current access type of a terminal device.

According to a first aspect, an embodiment of this application provides a positioning method. The method includes determining, by a location management function (LMF) network element based on an access type of a terminal device, a positioning method for the terminal device and an access type for obtaining a positioning parameter, and sending, by the LMF network element, the positioning method and indication information to a mobility management network element, where the indication information indicating to the mobility management network element that obtaining the positioning parameter using the access type.

In the method, there are a plurality of possibilities for a current access type of the terminal device, and different positioning methods are applicable to different access types. In this case, the LMF network element determines the positioning method based on the current access type of the terminal device, to prevent the finally determined positioning method from being inapplicable to the current access type of the terminal device.

In an optical solution, determining, by an LMF network element based on an access type of a terminal device, a positioning method for the terminal device and an access type for obtaining a positioning parameter includes determining, by the LMF network element based on the access type of the terminal device and a connectivity state of the terminal device, the positioning method for the terminal device and the access type for obtaining the positioning parameter. It can be learned that a positioning method that cannot be implemented by a corresponding access network device can be filtered out using the connectivity state.

In another optional solution, before determining, by an LMF network element based on an access type of a terminal device, a positioning method for the terminal device and an access type for obtaining a positioning parameter, the method further includes sending, by the LMF network element, a request message to the mobility management network element, where the request message is used to request at least one of location information of the terminal device, access type information of the terminal device, and connectivity state information.

In still another optional solution, before determining, by an LMF network element based on an access type of a terminal device, a positioning method for the terminal device and an access type for obtaining a positioning parameter, the method further includes receiving, by the LMF network element, a positioning request message from the mobility management network element, where the positioning request message includes a current access type of the terminal device and the connectivity state, or the positioning request message includes a current access type of the terminal device.

In still another optional solution, the indication information includes first indication information and second indication information, the first indication information indicating the access type for obtaining the positioning parameter, and the second indication information indicating that obtaining the positioning parameter based on the access type of and a connectivity state of the terminal device.

In still another optional solution, before determining, by an LMF network element based on an access type of a terminal device, a positioning method for the terminal device and an access type for obtaining a positioning parameter, the method further includes receiving, by the LMF network element, a positioning request message from the mobility management network element, where the positioning request message includes a current access type of the terminal device.

According to a second aspect, an embodiment of this application provides a positioning method. The method includes receiving, by a mobility management network element, a positioning method for a terminal device and indication information from an LMF network element, where the indication information indicating an access type for obtaining a positioning parameter, and obtaining, by the mobility management network element, the positioning parameter of the terminal device based on the positioning method and the indication information.

In the method, there are a plurality of possibilities for a current access type of the terminal device, and different positioning methods are applicable to different access types. In this case, the LMF network element determines the positioning method based on the current access type of the terminal device, to prevent the finally determined positioning method from being inapplicable to the current access type of the terminal device.

In an optional solution, before receiving, by a mobility management network element, a positioning method for a terminal device and indication information from an LMF network element, the method further includes receiving, by the mobility management network element, a request message from the LMF network element, and sending, by the mobility management network element, at least one of location information of the terminal device, access type information of the terminal device, and connectivity state information to the LMF network element based on the request message.

In another optional solution, before receiving, by a mobility management network element, a positioning method for a terminal device and indication information from an LMF network element, the method further includes sending, by the mobility management network element, a positioning request message to the LMF network element, where the positioning request message includes a current access type of the terminal device and a connectivity state, or the positioning request message includes a current access type of the terminal device.

In still another optional solution, the indication information includes first indication information and second indication information, the first indication information indicating the access type for obtaining the positioning parameter, and the second indication information indicating that obtaining the positioning parameter based on the access type and a connectivity state of the terminal device. Obtaining, by the mobility management network element, the positioning parameter of the terminal device based on the positioning method and the indication information includes obtaining, by the mobility management network element, the positioning parameter of the terminal device based on the positioning method, the first indication information, and the second indication information. It can be learned that a positioning method that cannot be implemented by a corresponding access network device can be filtered out using the connectivity state.

In still another optional solution, before receiving, by a mobility management network element, a positioning method for a terminal device and indication information from an LMF network element, the method further includes sending, by the mobility management network element, a positioning request message to the LMF network element, where the positioning request message includes an access type of the terminal device.

In still another optional solution, the indication information indicates a first access type and a second access type. Obtaining, by the mobility management network element, the positioning parameter of the terminal device based on the positioning method and the indication information includes selecting, by the mobility management network element, one access point from a first access point of the first access type and a second access point of the second access type, to obtain the positioning parameter of the terminal device.

According to a third aspect, an embodiment of this application provides an LMF network element. The LMF network element includes a transceiving unit and a processing unit. The processing unit is configured to determine, based on an access type of a terminal device, a positioning method for the terminal device and an access type for obtaining a positioning parameter, and the transceiving unit is configured to send the positioning method and indication information to a mobility management network element, where the indication information indicating to the mobility management network element that obtaining the positioning parameter using the access type.

In the LMF network element, there are a plurality of possibilities for a current access type of the terminal device, and different positioning methods are applicable to different access types. In this case, the LMF network element determines the positioning method based on the current access type of the terminal device, to prevent the finally determined positioning method from being inapplicable to the current access type of the terminal device.

In an optional solution, that the processing unit is configured to determine, based on an access type of a terminal device, a positioning method for the terminal device and an access type for obtaining a positioning parameter includes that the processing unit is configured to determine, based on the access type of the terminal device and a connectivity state of the terminal device, the positioning method for the terminal device and the access type for obtaining the positioning parameter. It can be learned that a positioning method that cannot be implemented by a corresponding access network device can be filtered out using the connectivity state.

In another optional solution, the transceiving unit is further configured to before the processing unit determines, based on the access type of the terminal device, the positioning method for the terminal device and the access type for obtaining the positioning parameter, send a request message to the mobility management network element, where the request message is used to request at least one of location information of the terminal device, access type information of the terminal device, and connectivity state information.

In still another optional solution, the transceiving unit is further configured to before the processing unit determines, based on the access type of the terminal device, the positioning method for the terminal device and the access type for obtaining the positioning parameter, receive a positioning request message from the mobility management network element, where the positioning request message includes a current access type of the terminal device and the connectivity state, or the positioning request message includes a current access type of the terminal device.

In still another optional solution, the indication information includes first indication information and second indication information, the first indication information indicating the access type for obtaining the positioning parameter, and the second indication information indicating that obtaining the positioning parameter based on the access type and a connectivity state of the terminal device.

In still another optional solution, the transceiving unit is further configured to before the processing unit determines, based on the access type of the terminal device, the positioning method for the terminal device and the access type for obtaining the positioning parameter, receive a positioning request message from the mobility management network element, where the positioning request message includes a current access type of the terminal device.

According to a fourth aspect, an embodiment of this application provides a mobility management network element, including a transceiving unit and a processing unit.

The transceiving unit is configured to receive a positioning method for a terminal device and indication information from an LMF network element, where the indication information indicating an access type for obtaining a positioning parameter, and the processing unit is configured to obtain the positioning parameter of the terminal device based on the positioning method and the indication information.

In the mobility management network element, there are a plurality of possibilities for a current access type of the terminal device, and different positioning methods are applicable to different access types. In this case, the LMF network element determines the positioning method based on the current access type of the terminal device, to prevent the finally determined positioning method from being inapplicable to the current access type of the terminal device.

In an optional solution, the transceiving unit is further configured to before receiving the positioning method for the terminal device and the indication information from the LMF network element, receive a request message from the LMF network element, and the transceiving unit is further configured to send at least one of location information of the terminal device, access type information of the terminal device, and connectivity state information to the LMF network element based on the request message.

In another optional solution, the transceiving unit is further configured to before receiving the positioning method for the terminal device and the indication information from the LMF network element, send a positioning request message to the LMF network element, where the positioning request message includes a current access type of the terminal device and a connectivity state, or the positioning request message includes a current access type of the terminal device.

In still another optional solution, the indication information includes first indication information and second indication information, the first indication information indicating the access type for obtaining the positioning parameter, and the second indication information indicating that obtaining the positioning parameter based on the access type and a connectivity state of the terminal device. That the processing unit is configured to obtain the positioning parameter of the terminal device based on the positioning method and the indication information includes that the processing unit is configured to obtain the positioning parameter of the terminal device based on the positioning method, the first indication information, and the second indication information. It can be learned that a positioning method that cannot be implemented by a corresponding access network device can be filtered out using the connectivity state.

In still another optional solution, the transceiving unit is further configured to before receiving the positioning method for the terminal device and the indication information from the LMF network element, send a positioning request message to the LMF network element, where the positioning request message includes an access type of the terminal device.

In still another optional solution, the indication information indicates the first access type and the second access type.

That the processing unit is configured to obtain the positioning parameter of the terminal device based on the positioning method and the indication information includes that the processing unit is configured to select one access point from a first access point of the first access type and a second access point of the second access type to perform the positioning method, to obtain the positioning parameter of the terminal device.

With reference to any one of the foregoing aspects or the optional solutions of the foregoing aspects, in still another optional solution, the location information includes at least one of a cell identifier of a cell on which the terminal device camps, an Internet Protocol (IP) address of the terminal device, a source User Datagram Protocol (UDP) port number of the terminal device, and a network element identifier of an N3GPP interworking function (N3IWF) network element connected to the terminal device.

With reference to any one of the foregoing aspects or the optional solutions of the foregoing aspects, in still another optional solution, the indication information indicates obtaining the positioning parameter based on the access type and the connectivity state of the terminal device.

With reference to any one of the foregoing aspects or the optional solutions of the foregoing aspects, in still another optional solution, the access type includes access using a 3GPP technology and/or access using an N3GPP technology.

With reference to any one of the foregoing aspects or the optional solutions of the foregoing aspects, in still another optional solution, the connectivity state includes a state of a first link between the terminal device and the first access point of the first access type and a state of a second link between the terminal device and the second access point of the second access type.

According to a fifth aspect, this application provides a computer-readable storage medium, where the computer-readable storage medium stores a program instruction, and when the program instruction is run on a processor, the method according to the first aspect or the second aspect is implemented.

According to a sixth aspect, this application provides a program product, where when the program product is run on a processor, the method according to the first aspect or the second aspect is implemented.

In the embodiments of this application, there are a plurality of possibilities for the current access type of the terminal device, and different positioning methods are applicable to different access types. In this case, the LMF network element determines the positioning method based on the current access type of the terminal device, to prevent the finally determined positioning method from being inapplicable to the current access type of the terminal device.

BRIEF DESCRIPTION OF DRAWINGS

The following describes the accompanying drawings used in some of the embodiments of this application.

DESCRIPTION OF EMBODIMENTS

The following describes the embodiments of this application with reference to the accompanying drawings in the embodiments of this application.

Figure 1:
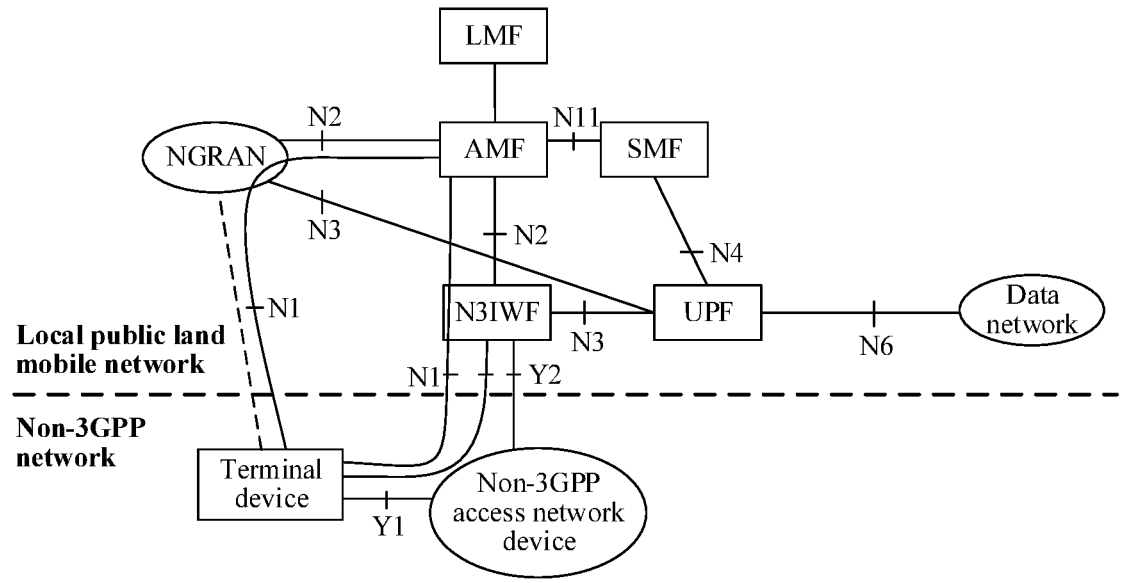
FIG. 1 is a schematic architectural diagram of a communications system according to an embodiment of this application.

FIG. 1 is a schematic architectural diagram of a wireless communications system according to an embodiment of this application. The wireless communications system includes a terminal device, a next generation radio access node (NGRAN), an N3GPP access network device, an N3IWF, an access and mobility management function (AMF), an LMF, a session management function (SMF), and a user plane function (UPF), and may further include other network elements that are not shown herein. In addition, N1, N2, N3, N4, N6, N11, Y1, and Y2 are all used to indicate different message types. The following describes the network elements listed above.

Terminal device: which may be a user equipment (UE), a handheld terminal, a notebook computer, a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, or another device that can access a network.

NGRAN: which is also an access network device, and is mainly responsible for functions on an air interface side, such as radio resource management, quality of service (QoS) management, and data compression and encryption. The access network device may include base stations in various forms, for example, a macro base station, a micro base station (also referred to as a small cell), a relay station, and an access point. In systems using different radio access technologies, a device having a base station function may have different names. For example, in a 5G system, the device is referred to as a gNB, in a Long-Term Evolution (LTE) system, the device is referred to as an evolved NodeB (eNB or eNodeB), and in a 3rd-generation (3G) system, the device is referred to as a NodeB.

AMF network element: which is a core network element, and is mainly responsible for signaling processing, for example, functions such as access control, mobility management, attachment, detachment, and gateway selection. When serving a session in the terminal device, the AMF network element provides a control plane storage resource for the session, to store a session identifier, an SMF network element identifier associated with the session identifier, and the like.

N3GPP access network device: which allows interconnection and interworking between the terminal device and a 3GPP core network using an N3GPP technology. The N3GPP technology is, for example, WI-FI or a Worldwide Interoperability for Microwave Access (WIMAX) network. The N3GPP access network device may be an untrusted N3GPP access network device. Compared with a trusted N3GPP access network device that can directly access the 3GPP core network, the network element needs to implement interconnection and interworking with the 3GPP core network using a security tunnel established by a security gateway. For example, the security gateway is an evolved packet data gateway (ePDG) or an N3IWF network element.

N3IWF network element: which is a security gateway between an untrusted N3GPP access network device and the 3GPP core network.

LMF network element: The network element is configured to select a corresponding positioning method based on a positioning precision requirement, a delay requirement, and the like, and select a corresponding communication protocol to complete exchange of information required for positioning. The LMF is further configured to provide other required information or a positioning policy for a positioning service.

SMF network element: which is responsible for user plane network element selection, user plane network element redirection, IP address allocation, bearer establishment, modification, and release, and QoS control.

UPF network element: which is responsible for forwarding and receiving of user data in the terminal device. The UPF network element may receive the user data from a data network, and transmit the user data to the terminal device using an access network device. Alternatively, the UPF network element may receive the user data from the terminal device using an access network device, and forward the user data to a data network. A transmission resource that serves the terminal device in the UPF network element are managed and controlled by the SMF network element.

It may be understood that in the communications system shown in FIG. 1, functions and interfaces of the network elements are merely examples. When the network elements are applied to the embodiments of this application, not all functions are necessary. All or some network elements in a core network may be physical network elements, or may be virtualized network elements. This is not limited herein.

"/" in the embodiments of this application describes only an association relationship for describing associated objects and represents that three relationships may exist. For example, A/B may represent the following three cases: only A exists, both A and B exist, and only B exists. In addition, in the descriptions of this application, "a plurality of" means two or more than two.

In the embodiments of this application, that a network element (for example, a network element A) obtains information from another network element (for example, a network element B) may mean that the network element A directly receives the information from the network element B, or may mean that the network element A receives the information from the network element B using another network element (for example, a network element C). When the network element A receives the information from the network element B using the network element C, the network element C may transparently transmit the information, or may process the information. For example, the network element C may add the information to different messages for transmission, or may sift the information, and send only information that is sifted out to the network element A. Similarly, in the embodiments of this application, that the network element A sends information to the network element B may mean that the network element A directly sends the information to the network element B, or may mean that the network element A sends the information to the network element B using another network element (for example, the network element C).

Figure 2:
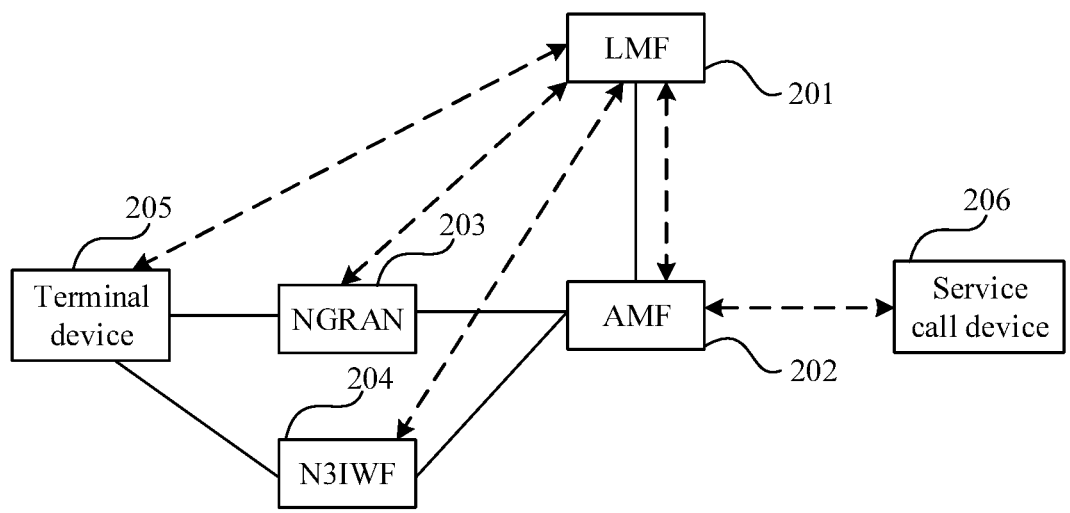
FIG. 2 is a schematic architectural diagram of another communications system according to an embodiment of this application.

This application focuses on an information exchange procedure in the positioning service. The information exchange procedure mainly relates to network elements including an LMF 201, an AMF 202, an NGRAN 203, an N3IWF 204, a terminal device 205, and a service call device 206, and a corresponding architecture is shown in FIG. 2 (a dashed line indicates a link that needs to be relayed by another node, and a solid line indicates a link that does not need to be relayed by another node). A procedure of a subsequent positioning method is mainly described with reference to the network elements in the architecture shown in FIG. 2.

Figure 3:
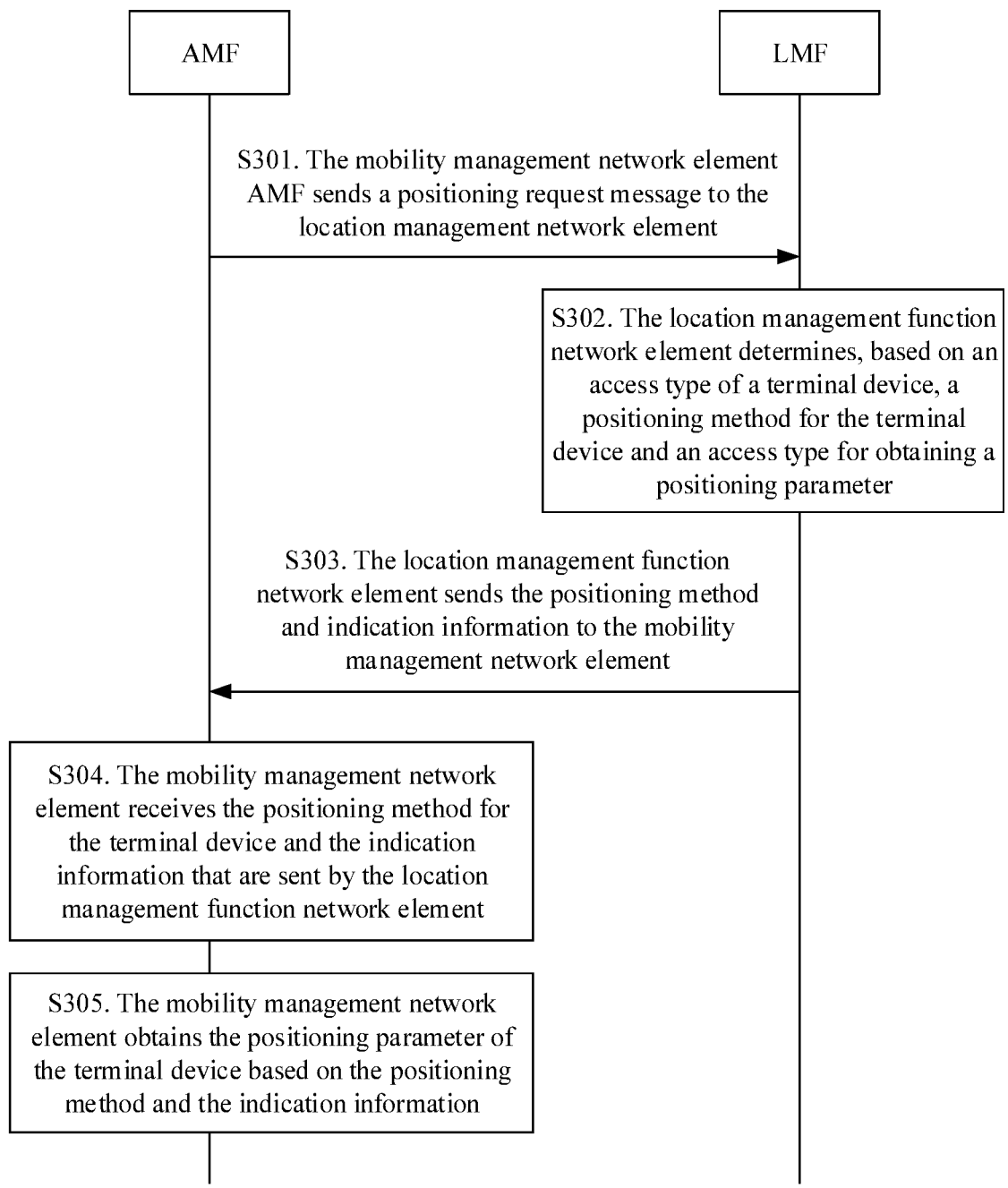
FIG. 3 is a schematic flowchart of a positioning method according to an embodiment of this application.

FIG. 3 shows a positioning method according to an embodiment of this application. The method may be applied to positioning scenarios such as an NI-LR procedure, an MT-LR procedure, and an MO-LR procedure. The method includes but is not limited to the following steps.

Step S301. A mobility management network element AMF sends the positioning request message to a location management network element.

Further, the AMF receives the positioning request message that is sent (directly or indirectly) by a service call device for a terminal device. The positioning request message includes a positioning requirement, for example, a delay requirement or a precision requirement. The AMF forwards the positioning request message of the service call device to the LMF such that the LMF selects, from a plurality of positioning methods, one positioning method or some positioning methods that can meet the positioning requirement. Currently, the positioning methods include, but are not limited to, a network-assisted global navigation satellite system (GNSS) method, downlink positioning, enhanced cell identifier (eCID) positioning, uplink positioning, barometric pressure sensor positioning, wireless local area network (WLAN) positioning, BLUETOOTH positioning, a terrestrial beacon system positioning method, and the like. In addition, the service call device may be a device such as a network exposure function (NEF) network element or a positioning server. Alternatively, the AMF may be a service call device. If the AMF is a service call device, in step S301, the AMF does not need to receive a positioning request message from another device.

Step S302. The LMF network element determines, based on an access type of the terminal device, a positioning method for the terminal device and an access type for obtaining a positioning parameter.

Further, when determining the positioning method, the location management network element not only considers the requirements on precision, a delay, and the like, but also considers a current access type of the terminal device. That is, when other factors (for example, the precision and the delay) are the same, if the access type of terminal device varies, positioning methods for the terminal device that are determined by the LMF network element may be different. Optionally, the access type of the terminal device has at least the following three possibilities 1. access of the terminal device using a 3GPP technology, 2. access of the terminal device using an N3GPP technology, and 3. access of the terminal device using a 3GPP technology and an N3GPP technology.

In this application, the access type required for obtaining the positioning parameter further needs to be determined, to subsequently obtain, based on the access type, the positioning parameter required for positioning of the terminal device. For example, if the downlink positioning method needs to be implemented based on the access type of 3GPP access to obtain the positioning parameter, the access type for obtaining the positioning parameter needs to be the 3GPP access. For another example, if the WLAN positioning method may be implemented based on two access types, that is, the 3GPP access and the N3GPP access, to obtain the positioning parameter, the type for obtaining the positioning parameter may be the 3GPP access and (or) the N3GPP access. In addition, the positioning parameter may include at least one of a cell identifier (Cell ID) of a cell accessed by the terminal device, an identifier of an N3IWF accessed by the terminal device, an IP address of the terminal device, WLAN information related to the terminal device, latitude and longitude information of the terminal device, a wireless signal strength of the terminal device, a propagation delay, and the like.

It should be noted that, that the LMF network element determines, based on an access type of the terminal device, a positioning method for the terminal device and an access type for obtaining a positioning parameter further includes, but is not limited to, the following two cases:

Case 1: The LMF network element determines, based on the access type of the terminal device, the positioning method for the terminal device and the access type for obtaining the positioning parameter. The location management network element does not use a connectivity state of the terminal device in a process of determining the positioning method. The connectivity state of the terminal device includes a state of a first link between the terminal device and a first access point (for example, an NGRAN) of a first access type (for example, the 3GPP access type) and a state of a second link between the terminal device and a second access point (for example, the N3IWF) of a second access type (for example, the N3GPP access type). A state of any link may be a connected state, or may be an idle state.

In this case, the access type of the terminal device that is used by the terminal device may be obtained in the following manners:

Manner A: The LMF network element sends a request message to the mobility management network element, where the request message is used to request access type information of the terminal device. Correspondingly, the mobility management network element feeds back the obtained access type information of the terminal device to the location management network element based on the request message. Optionally, the LMF network element may further send a request message to request location information of the terminal. The location information includes at least one of a cell identifier of a cell on which the terminal device camps, the IP address of the terminal device, a source UDP port number of the terminal device, and a network element identifier of an N3IWF element connected to the terminal device. An example in which the request message is a subscription request message is used for description. The LMF network element sends the subscription request message to the mobility management network element (for example, using a Namf_EventExposure_Subscribe interface), where the subscription request message is used to request the mobility management network element to perform the following operations:

Operation 1: If the location information of the terminal device changes, the mobility management network element feeds back the location information to the location management network element, where the fed back location information includes location information obtained after the change, and may further include location information that is before the change. It should be noted that the location information may be used to estimate an approximate location of the terminal device. When the precision requirement is not high, a location identified by the location information may be directly used as a location of the terminal device. Operation 1 is an optional operation.

Operation 2: If the access type of the terminal device changes, the mobility management network element feeds back the access type of the terminal device to the location management network element, where the fed back access type includes an access type obtained after the change, and may further include an access type that is before the change.

In a possible implementation, after receiving the subscription request message, the mobility management network element AMF immediately feeds back information such as the location information and the access type to the LMF network element.

Manner B: When sending (for example, using a Namf_Location_DetermineLocation service interface), to the LMF network element, the positioning request message used to request a location of the terminal device, the mobility management network element actively adds current access type information of the terminal device to the positioning request message. In this way, the LMF network element can obtain the current access type of the terminal device based on the positioning request message.

Case 2: The LMF network element determines, based on the access type of the terminal device, the positioning method for the terminal device and the access type for obtaining the positioning parameter. The location management network element uses a connectivity state in a process of determining the positioning method. For example, if some positioning methods are first determined based on the access type (further, the positioning precision, the positioning delay, and the like), in these positioning methods, some are applicable only to the 3GPP access, some are applicable only to the N3GPP access, and some are applicable to both the 3GPP access and the N3GPP access, and in this case, a connectivity state of the N3GPP access type is an idle state, the location management network element may filter out, from the some positioning methods, the positioning methods that are applicable only to N3GPP access, and remaining positioning methods after the filtering are positioning methods for the terminal device that are determined by the location management network element based on both the access type of the terminal device and the connectivity state of the terminal device.

In this case, the access type and the connectivity state of the terminal device that are used by the terminal device may be obtained in the following manners:

Manner A: The LMF network element sends a request message to the mobility management network element, where the request message is used to request access type information and the connectivity state of the terminal device. Correspondingly, the mobility management network element feeds back the obtained access type information and connectivity state information of the terminal device to the location management network element based on the request message. Optionally, the LMF network element may further send a request message to request location information of the terminal. An example in which the request message is a subscription request message is used for description. The LMF network element sends the subscription request message to the mobility management network element (for example, using a Namf_EventExposure_Subscribe interface), where the subscription request message is used to request the mobility management network element to perform the following operations:

Operation 1: If the location information of the terminal device changes, the mobility management network element feeds back the location information to the location management network element, where the fed back location information includes location information obtained after the change, and may further include location information that is before the change. Operation 1 is an optional operation.

Operation 2: If the access type of the terminal device changes, the mobility management network element feeds back the access type to the location management network element, where the fed back access type includes an access type obtained after the change, and may further include an access type that is before the change.

Operation 3: If the connectivity state of the terminal device changes, the mobility management network element feeds back the connectivity state to the location management network element, where the fed back connectivity state includes a connectivity state obtained after the change, and may further include a connectivity state that is before the change.

In a possible implementation, after receiving the subscription request message, the mobility management network element AMF immediately feeds back information such as the location information, the access type, and the connectivity state to the LMF network element.

Manner B: When sending (for example, using a Namf_Location_DetermineLocation service interface), to the LMF network element, the positioning request message used to request a location of the terminal device, the mobility management network element actively adds current access type information and connectivity state information of the terminal device to the positioning request message such that the LMF network element can obtain the current access type of the terminal device and the connectivity state of the terminal device based on the positioning request message, or the mobility management network element actively adds current access type information of the terminal device to the positioning request message such that the LMF network element can obtain the current access type of the terminal device based on the positioning request message, and the location management network element obtains the connectivity state of the terminal device in another manner.

Step S303. The LMF network element sends the positioning method and indication information to the mobility management network element.

Step S304. The mobility management network element receives the positioning method for the terminal device and the indication information from the LMF network element.

Step S305. The mobility management network element obtains the positioning parameter of the terminal device based on the positioning method and the indication information.

Further, in Case 1 and Case 2, content further indicated by the indication information is different. Descriptions are separately provided below.

In Case 1, the indication information indicating to the mobility management network element that obtaining the positioning parameter using the access type. The mobility management network element implements, based on the access type of the positioning parameter, the positioning method from the location management network element, to obtain the positioning parameter. In addition, the LMF network element further sends N1 or N2 type information to the mobility management network element, to instruct to send the positioning method to the terminal device or an access node (for example, an access point of the 3GPP access type or an access point of the N3GPP access type), to notify which node is used for obtaining the positioning parameter.

In another possible implementation, the indication information further carries N1 or N2 type information, to instruct to send the positioning method to the UE or an access node (for example, an access point of the 3GPP access type or an access point of the N3GPP access type), to notify which node is used for obtaining the positioning parameter. For example, the N1 type information indicating that sending the positioning method to the terminal device, and obtaining the positioning parameter using the terminal device. The N2 type information indicating that sending the positioning method to the access node, and obtaining the positioning parameter using the access node.

In another possible implementation, the indication information is included in N1 or N2 type information.

In Case 2, the indication information is used to instruct to obtain the positioning parameter based on the access type and the connectivity state of the terminal device. In a possible implementation, the indication information includes first indication information and second indication information, the first indication information indicates the foregoing determined access type of the positioning parameter, and the second indication information indicating that obtaining the positioning parameter based on the access type and the connectivity state of the terminal device. Correspondingly, after learning of the content indicated by the indication information, the mobility management network element needs to first determine the connectivity state of the terminal device, and then filter, based on the connectivity state, some positioning methods from the location management network element. For example, in these positioning methods, if some are applicable only to the 3GPP access technology, some are applicable only to the N3GPP access technology, and some are applicable to both the 3GPP access technology and the N3GPP access technology, and in this case, a connectivity state of the N3GPP access type is an idle state, the location management network element may filter out, from the some positioning methods, the positioning methods that are applicable only to N3GPP access, and then obtain the positioning parameter using remaining positioning methods obtained after the filtering. Further, the remaining positioning methods are implemented based on access types to which the remaining positioning methods are applicable, to obtain the positioning parameter.

In another possible implementation, the indication information further carries N1 or N2 type information, to instruct to send the positioning method to the UE or an access node (for example, an access point of the 3GPP access type or an access point of the N3GPP access type), to notify which node is used for obtaining the positioning parameter. For example, the N1 type information indicating that sending the positioning method to the terminal device, and obtaining the positioning parameter using the terminal device. The N2 type information indicating that sending the positioning method to the access node, and obtaining the positioning parameter using the access node.

In another possible implementation, the indication information is included in N1 or N2 type information.

In a possible implementation, if there are a plurality of positioning methods determined based on the access type and the connectivity state, the mobility management network element may select some of the plurality of positioning methods as positioning methods that are finally used to obtain the positioning parameter. In some positioning methods, some may need to be implemented using the 3GPP access type, and other positioning methods may need to be implemented using the N3GPP access type. Alternatively, all the some positioning methods may need to be implemented using the 3GPP access type. Alternatively, all the some positioning methods may need to be implemented using the N3GPP access type. Optionally, the indication information indicates the first access type and the second access type. Therefore, obtaining, by the mobility management network element, the positioning parameter of the terminal device based on the positioning method and the indication information may include selecting, by the mobility management network element, one access type from the first access type and the second access type, to implement the positioning method. This is equivalent to obtaining one access point from the first access point of the first access type and the second access point of the second access type, to implement the positioning method.

For a positioning method that needs to be implemented using the 3GPP access type, the AMF sends the positioning method to a 3GPP access network device, that is, the NGRAN such that the NGRAN obtains the positioning parameter using the positioning method. In a possible implementation, the NGRAN may send a message to the terminal device such that the terminal device obtains the positioning parameter and feeds back the positioning parameter to the NGRAN. Subsequently, the NGRAN feeds back the positioning parameter to the AMF, and the AMF forwards the positioning parameter to the LMF, or processes the positioning parameter and then forwards the positioning parameter to the LMF.

For a positioning method that needs to be implemented using the N3GPP access type, the AMF sends the positioning method to a security gateway in N3GPP access, that is, the N3IWF such that the N3IWF obtains the positioning parameter using the positioning method. Optionally, the N3IWF may send a message to the terminal device such that the terminal device obtains the positioning parameter, and feeds back the positioning parameter to the N3IWF. Subsequently, the N3IWF feeds back the positioning parameter to the AMF, and the AMF forwards the positioning parameter to the LMF, or processes the positioning parameter and then forwards the positioning parameter to the LMF.

Finally, the LMF determines the location of the terminal device based on the positioning parameter, and sends the determined location to the AMF. Then, the AMF feeds back the location to the service call device (that is, a requester of the location of the terminal device).

In this embodiment of this application, if a link between the terminal device and an access network device of an access type to which the positioning method determined by the LMF network element based on the requirements on the precision, the delay, and the like is applicable is in an idle state, the LMF may feed back an error prompt message to the AMF, to notify that there is no applicable positioning method, or the location management network element re-determines a positioning method based on other information, provided that a link between the terminal device and an access network device of an access type to which the re-determined positioning method is applicable is in a connected state. It can be learned that a positioning method that cannot be implemented by a corresponding access network device can be filtered out using the connectivity state.

In the method described in FIG. 3, there are a plurality of possibilities for the current access type of the terminal device, and different positioning methods are applicable to different access types. In this case, the LMF network element determines the positioning method based on the current access type of the terminal device, to prevent the finally determined positioning method from being inapplicable to the current access type of the terminal device.

A plurality of possible implementation solutions is described in the embodiment shown in FIG. 3. Procedures of several implementation solutions are described below with reference to FIG. 4A and FIG. 4B to FIG. 6, to facilitate understanding. Execution principles of important steps have been described in detail in the embodiment shown in FIG. 3. Therefore, principles of corresponding steps are not explained excessively herein.

Figure 4A:
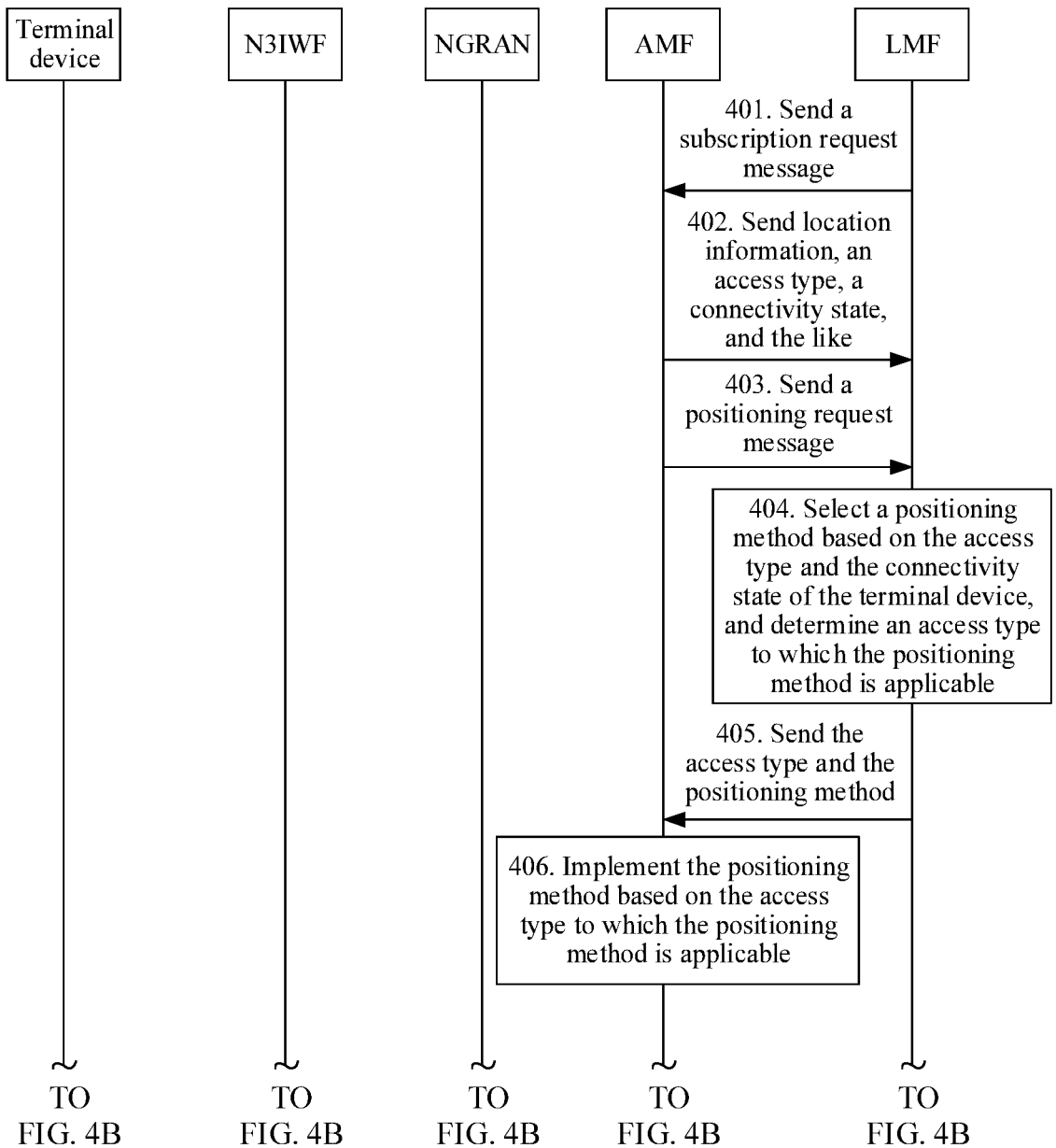
FIG. 4A and FIG. 4B are a schematic flowchart of another positioning method according to an embodiment of this application.
Figure 4B:
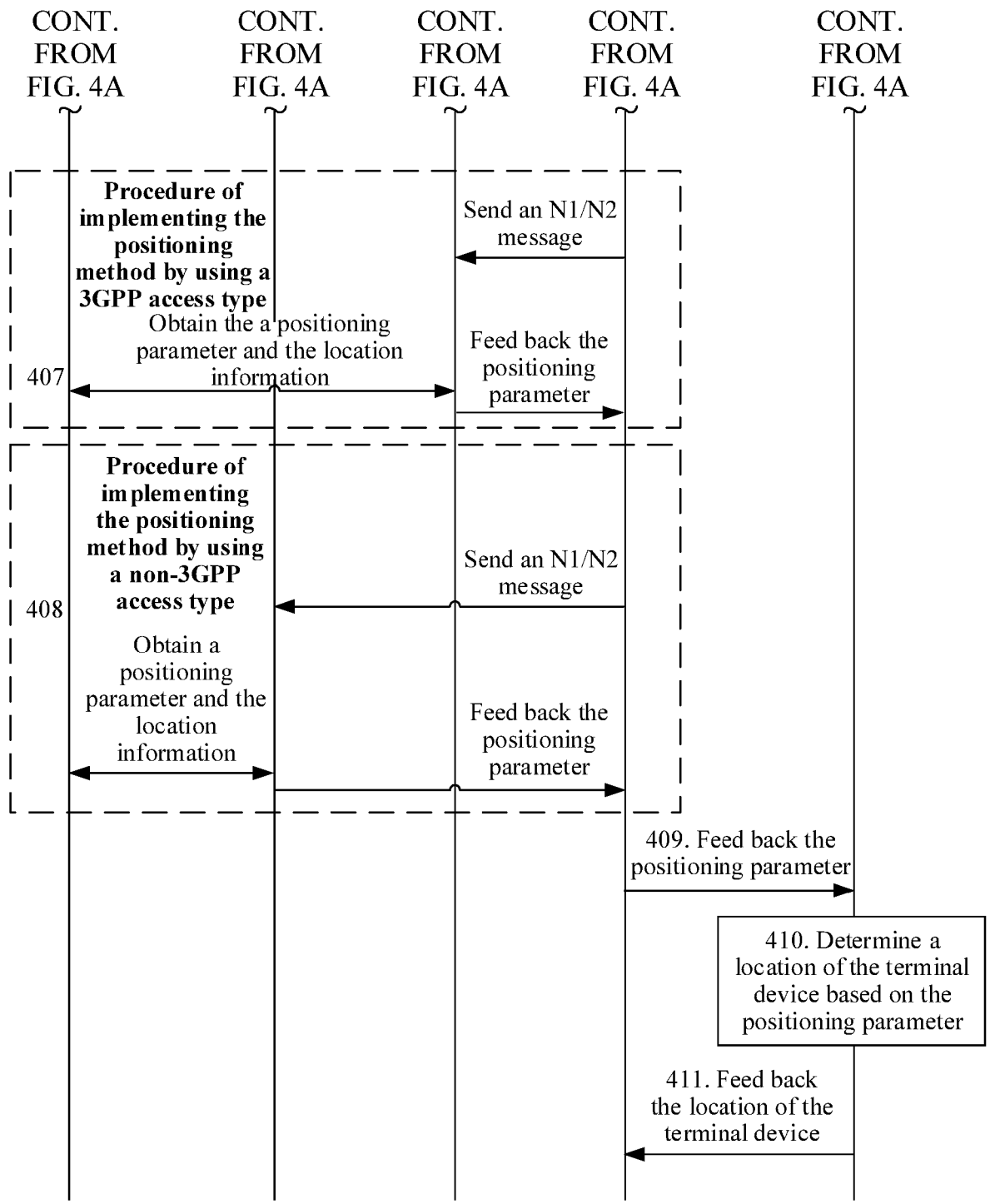

FIG. 4A and FIG. 4B show a positioning method according to an embodiment of this application. The positioning method mainly reflects that an LMF sends a subscription request message to an AMF, to request an access type, a connectivity state, location information, and the like that are required for determining a positioning method. The positioning method includes the following steps.

Step 401. The LMF sends the subscription request message to the AMF.

Step 402. The AMF sends information such as the location information, the access type, and the connectivity state to the LMF according to a subscription rule.

Step 403. The AMF sends a positioning request message for a terminal device to the LMF.

Step 404. The LMF selects the positioning method based on the access type and the connectivity state of the terminal device, and determines an access type to which the positioning method is applicable.

Step 405. The LMF sends, to the AMF, the determined positioning method and the access type to which the positioning method is applicable.

Step 406. The AMF implements the positioning method based on the access type to which the positioning method is applicable.

Step 407. If the determined positioning method is applicable to a 3GPP access type, the AMF implements the positioning method using the 3GPP access type, to obtain a positioning parameter.

Step 408. If the determined positioning method is applicable to an N3GPP access type, the AMF implements the positioning method using the N3GPP access type, to obtain a positioning parameter.

Step 409. The AMF sends the obtained positioning parameter to the LMF.

Step 410. The LMF receives the positioning parameter from the AMF, and determines a location of the terminal device based on the positioning parameter.

Step 411. The LMF sends the location of the terminal device to the AMF such that the AMF sends the location of the terminal device to a service call device.

Figure 5:
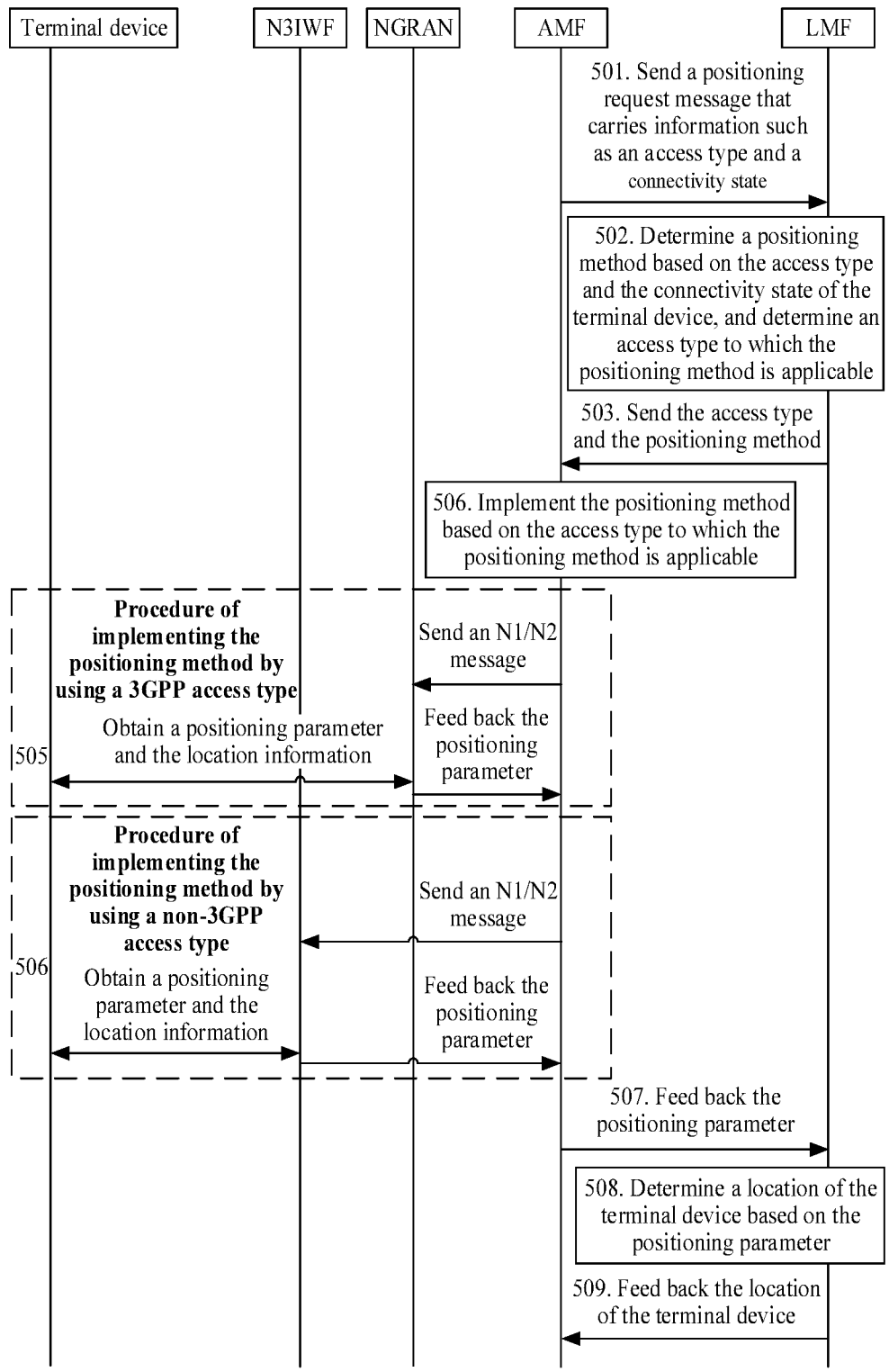
FIG. 5 is a schematic flowchart of still another positioning method according to an embodiment of this application.

FIG. 5 shows a positioning method according to an embodiment of this application. The positioning method mainly reflects that when sending a positioning request message to an LMF, an AMF actively adds an access type, a connectivity state, and the like that are required for determining a positioning method. The positioning method includes the following steps.

Step S01. The AMF sends the positioning request message for a terminal device to the LMF, where the positioning request message carries information such as the access type and the connectivity state.

Step S02. The LMF selects the positioning method based on the access type and the connectivity state of the terminal device, and determines an access type to which the positioning method is applicable.

Step S03. The LMF sends, to the AMF, the determined positioning method and the access type to which the positioning method is applicable.

Step S04. The AMF implements the positioning method based on the access type to which the positioning method is applicable.

Step S05. If the determined positioning method is applicable to a 3GPP access type, the AMF implements the positioning method using the 3GPP access type, to obtain a positioning parameter.

Step S06. If the determined positioning method is applicable to an N3GPP access type, the AMF implements the positioning method using the N3GPP access type, to obtain a positioning parameter.

Step S07. The AMF sends the obtained positioning parameter to the LMF.

Step S08. The LMF receives the positioning parameter from the AMF, and determines a location of the terminal device based on the positioning parameter.

Step S09. The LMF sends the location of the terminal device to the AMF such that the AMF sends the location of the terminal device to a service call device.

Figure 6:
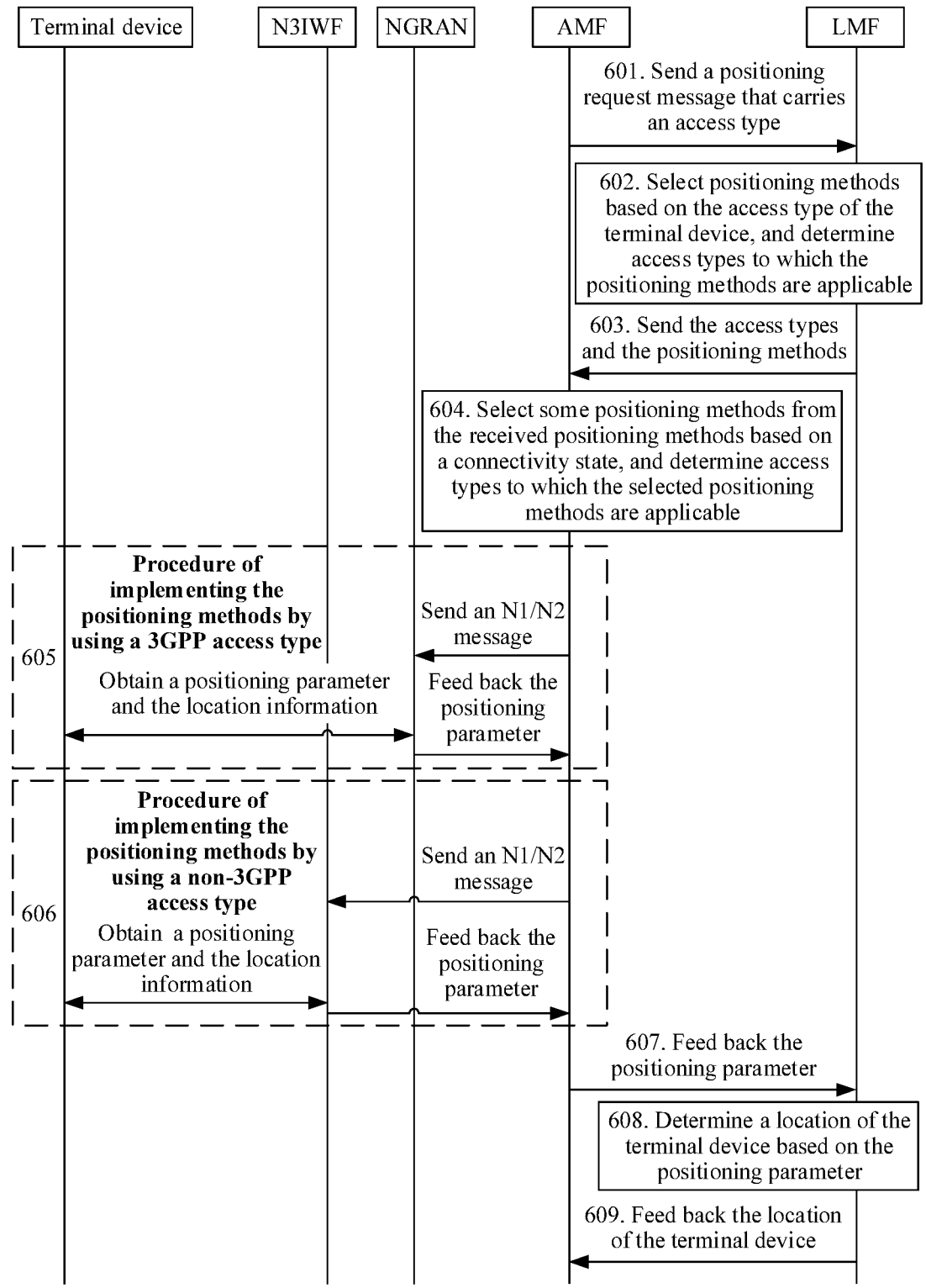
FIG. 6 is a schematic flowchart of still another positioning method according to an embodiment of this application.

FIG. 6 shows a positioning method according to an embodiment of this application. The positioning method mainly reflects that an LMF first determines approximate positioning methods based on an access type, and then an AMF filters the determined positioning methods with reference to a connectivity state, to determine a final positioning method. The positioning method includes the following steps.

Step 601. The AMF sends a positioning request message for a terminal device to the LMF, where the positioning request message carries the access type.

Step 602. The LMF selects the positioning methods based on the access type of the terminal device, and determines access types to which the positioning methods are applicable.

Step 603. The LMF sends, to the AMF, the determined positioning methods and the access types to which the positioning methods are applicable.

Step 604. The AMF selects some positioning methods from the received positioning methods based on the connectivity state, and determines access types to which the selected positioning methods are applicable.

Step 605. If the determined positioning methods are applicable to a 3GPP access type, the AMF implements the positioning methods using the 3GPP access type, to obtain a positioning parameter.

Step 606. If the determined positioning methods are applicable to an N3GPP access type, the AMF implements the positioning methods using the N3GPP access type, to obtain a positioning parameter.

Step 607. The AMF sends the obtained positioning parameter to the LMF.

Step 608. The LMF receives the positioning parameter from the AMF, and determines a location of the terminal device based on the positioning parameter.

Step 609. The LMF sends the location of the terminal device to the AMF such that the AMF sends the location of the terminal device to a service call device.

The method in the embodiments of this application is described above in detail, and an apparatus in the embodiments of this application is provided below.

The foregoing mainly describes, from a perspective of interaction between network elements, the solutions provided in the embodiments of this application. It may be understood that to implement the foregoing functions, the network elements, for example, the LMF network element and the mobility management network element, include a corresponding hardware structure and/or a corresponding software module for performing the functions. A person skilled in the art should easily be aware that, in combination with the examples described in the embodiments disclosed in this specification, network elements, algorithms, and steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the LMF network element and the mobility management network element may be divided into function modules based on the foregoing method examples. For example, the function modules may be obtained through division corresponding to functions, or two or more functions may be integrated into one processing module. The integrated module may be implemented in a form of hardware, or may be implemented in a form of a software function module. It should be noted that, in the embodiments of this application, module division is an example, and is merely logical function division. In an actual implementation, another division manner may be used.

Figure 7:
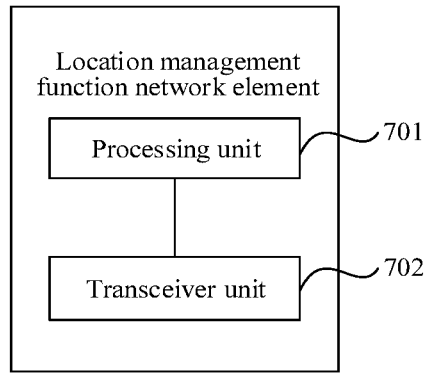
FIG. 7 is a schematic structural diagram of an LMF network element according to an embodiment of this application.

When the function modules are obtained through division corresponding to the functions, FIG. 7 is a possible schematic structural diagram of the LMF network element in the foregoing embodiments. The LMF network element includes a processing unit 701 and a transceiving unit 702. The processing unit 701 is configured to support the LMF network element in performing other functions performed by the LMF network element in the method embodiments than sending and receiving functions, and the transceiving unit 702 is configured to support the LMF network element in performing information receiving and sending steps performed by the LMF network element in the method embodiments.

In hardware implementation, the processing unit 701 may be a processor, a processing circuit, or the like. The transceiving unit 702 may include a receiver and/or a transmitter, or include a receiver circuit and/or a transmitter circuit, a communications interface, or the like. The processing unit 701 may control the transceiving unit 702 such that the transceiving unit performs a corresponding operation. The processing unit 701 may include one or more processing subunits. This is not limited herein.

Figure 8:
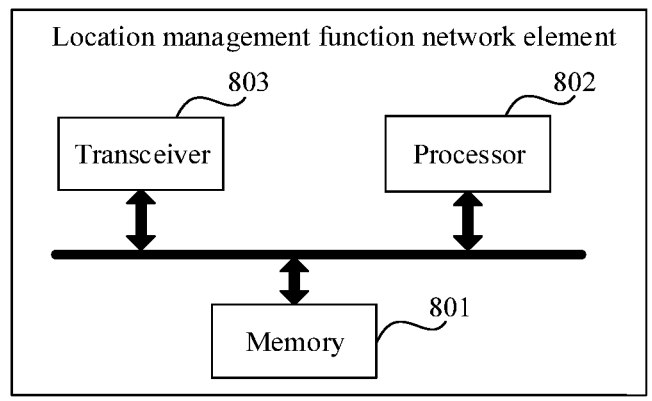
FIG. 8 is a schematic structural diagram of another LMF network element according to an embodiment of this application.

FIG. 8 is a possible schematic diagram of a logical structure of the LMF network element in the foregoing embodiments according to an embodiment of this application. The LMF network element includes a processor 802. In this embodiment of this application, the processor 802 is configured to control and manage an action of the LMF network element. For example, the processor 802 is configured to support the LMF network element in performing the operation of determining the positioning method and the access type of the positioning parameter by the LMF network element in the method embodiments. The LMF network element may further include a memory 801 and a transceiver 803. The processor 802, the transceiver 803, and the memory 801 may be connected to each other (for example, connected to each other via a bus). The memory 801 is configured to store code and data of the LMF network element. The transceiver 803 is configured to support the LMF network element in performing information sending and receiving operations performed in the method embodiments.

The memory 801 may be a memory in the processor 802, or may be separated from the processor 802.

The transceiver 803 may alternatively be a communications interface of the LMF network element, or a communications interface of the processor 802.

The processor 802 may be a central processing unit, a general-purpose processor, a digital signal processor, an application-specific integrated circuit, a field programmable gate array or another programmable logic device, a transistor logic device, a hardware component, or any combination thereof. The processor 802 may implement or execute various examples of logical blocks, modules, and circuits described with reference to content disclosed in this application. Alternatively, the processor may be a combination of processors implementing a computing function, for example, a combination of one or more microprocessors, or a combination of a digital signal processor and a microprocessor.

Figure 9:
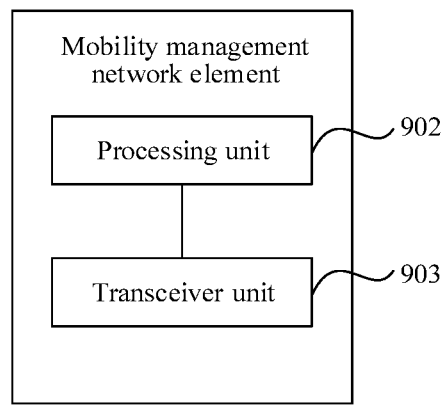
FIG. 9 is a schematic structural diagram of a mobility management network element according to an embodiment of this application.

When the function modules are obtained through division corresponding to the functions, FIG. 9 is a possible schematic structural diagram of the mobility management network element in the foregoing embodiments. The mobility management network element includes a transceiving unit 903 and a processing unit 902. The transceiving unit 903 is configured to support the mobility management network element in performing information sending and receiving steps performed in the method embodiments. The processing unit 902 is configured to support the mobility management network element in performing other functions performed by the mobility management network element in the method embodiments than the sending and receiving functions. The processing unit 903 may include one or more processing subunits. This is not limited herein.

In hardware implementation, the transceiving unit 903 may include a receiver and/or a transmitter, or include a receiver circuit and/or a transmitter circuit, a communications interface, or the like. The processing unit 902 may be a processor, a processing circuit, or the like.

Figure 10:
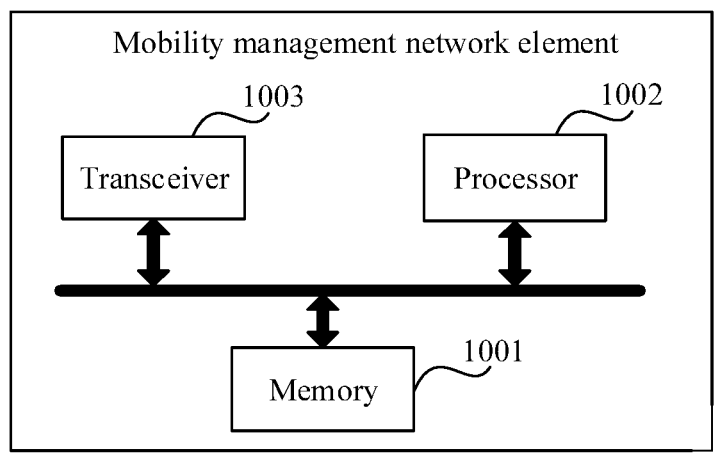
FIG. 10 is a schematic structural diagram of another mobility management network element according to an embodiment of this application.

FIG. 10 is a possible schematic diagram of a logical structure of the mobility management network element in the foregoing embodiments according to an embodiment of this application. The mobility management network element includes a processor 1002. In this embodiment of this application, the processor 1002 is configured to control and manage an action of the mobility management network element in the embodiments. Optionally, the mobility management network element may further include a memory 1001 and a transceiver 1003. The processor 1002, the transceiver 1003, and the memory 1001 may be connected to each other (for example, connected to each other via a bus). The memory 1001 is configured to store program code and data of the mobility management network element. The transceiver 1003 is configured to support the mobility management network element in performing information sending and receiving operations performed in the method embodiments.

The memory 1001 may be a memory in the processor 1002, or may be separated from the processor 1002.

The transceiver 1003 may alternatively be a communications interface of the LMF network element, or a communications interface of the processor 1002.

The processing 1002 may be a central processing unit, a general-purpose processor, a digital signal processor, an application-specific integrated circuit, a field programmable gate array or another programmable logic device, a transistor logic device, a hardware component, or any combination thereof. The processor may implement or execute various examples of logical blocks, modules, and circuits described with reference to content disclosed in this application. Alternatively, the processor may be a combination of processors implementing a computing function, for example, a combination of one or more microprocessors, or a combination of a digital signal processor and a microprocessor.

In another embodiment of this application, a readable storage medium is further provided. The readable storage medium stores a computer executable instruction. A device (which may be a single-chip microcomputer, a chip, or the like) or a processor may invoke the computer executable instruction stored in the readable storage medium, to perform the steps of the mobility management network element or the LMF network element in the positioning method provided in FIG. 3, FIG. 4A and FIG. 4B, FIG. 5, or FIG. 6. The readable storage medium may include any medium that can store program code, such as a Universal Serial Bus (USB) flash drive, a removable hard disk, a read-only memory (ROM), a random-access memory (RAM), a magnetic disk, or an optical disc.

In another embodiment of this application, a computer program product is further provided. The computer program product stores a computer executable instruction, and the computer executable instruction is stored in a computer-readable storage medium. At least one processor of a device may read the computer executable instruction form the computer-readable storage medium, and the at least one processor executes the computer executable instruction such that the device performs the steps of the mobility management network element or the LMF network element in a positioning method provided in FIG. 3, FIG. 4A and FIG. 4B, FIG. 5, or FIG. 6.

Still another aspect of this application provides a device. The device includes a processor, and the processor runs code in a memory such that the device performs the foregoing methods. The memory stores the code and data. The memory is located in the device, and is coupled to the processor. Alternatively, the memory may be located outside the device.

In the embodiments of this application, for ease of understanding, a plurality of examples is used for description. However, these examples are merely examples, and may not be optimal implementations for implementing this application.

In the embodiments of this application, for ease of description, names of a request message, a response message, and various other messages are used. However, these messages are merely used as examples to describe content that needs to be carried or functions that need to be implemented. A specific name of a message constitutes no limitation on this application. For example, the messages may be a first message, a second message, and a third message. These messages may be specific messages, or may be some fields in messages. These messages may also represent various service operations.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a digital versatile disc (DVD)), a semiconductor medium (for example, a solid-state drive (SSD)), or the like.

In conclusion, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a location management function (LMF) network element and comprising:

receiving, from a mobility management network element, a positioning request message comprising current access types of a terminal device and connectivity states of the terminal device corresponding to the current access types, wherein the connectivity states comprise a first state of a first link between the terminal device and a first access point of a 3rd Generation Partnership Project (3GPP) access type and a second state of a second link between the terminal device and a second access point of a non-3GPP (N3GPP) access type, and wherein the current access types comprise the 3GPP access type and the N3GPP access type;

determining, based on the current access types and the connectivity states, a positioning method for the terminal device and an access type applicable to the positioning method, wherein the access type applicable to the positioning method is one of the current access types, and wherein a connectivity state corresponding to the access type applicable to the positioning method is a connected state; and sending the positioning method and the access type applicable to the positioning method to the mobility management network element.

2. The method of claim 1, wherein before determining the positioning method and the access type, the method further comprises sending a request message to the mobility management network element requesting at least one of location information of the terminal device, access type information of the terminal device, or connectivity state information.

3. The method of claim 1, wherein the first access point is a next generation radio access node, and wherein the second access point is an N3GPP interworking function (N3IWF) network element.

4. A method comprising:

sending, by a mobility management network element and to a location management function (LMF) network element, a positioning request message comprising current access types of a terminal device and connectivity states of the terminal device corresponding to the current access types, wherein the connectivity states comprise a first state of a first link between the terminal device and a first access point of a 3rd Generation Partnership Project (3GPP) access type and a second state of a second link between the terminal device and a second access point of a non-3GPP (N3GPP) access type, and wherein the current access types comprise the 3GPP access type and the N3GPP access type;

determining, by the LMF network element based on the current access types and the connectivity states, a positioning method for the terminal device and an access type applicable to the positioning method, wherein the access type applicable to the positioning method is one of the current access types, and wherein a connectivity state corresponding to the access type applicable to the positioning method is a connected state;

sending, by the LMF network element, the positioning method and the access type applicable to the positioning method to the mobility management network element; and obtaining, by the mobility management network element, a positioning parameter based on the positioning method and the access type applicable to the positioning method.

5. The method of claim 4, wherein the first access point is a next generation radio access node, and wherein the second access point is an N3GPP interworking function (N3IWF) network element.

6. The method of claim 4, wherein the positioning parameter comprises an identifier of a non-3rd Generation Partnership Project (N3GPP) interworking function (N3IWF) network element accessed by the terminal device.

7. The method of claim 4, wherein the positioning parameter comprises wireless local area network (WLAN) information related to the terminal device.

8. The method of claim 4, wherein the positioning parameter comprises a wireless signal strength of the terminal device.

9. The method of claim 4, wherein the positioning parameter a propagation delay.

10. The method of claim 4, wherein the positioning parameter comprises an identifier of a non-3rd Generation Partnership Project (N3GPP) interworking function (N3IWF) network element accessed by the terminal device, wireless local area network (WLAN) information related to the terminal device, a wireless signal strength of the terminal device, or a propagation delay.

11. An apparatus comprising:
a memory configured to store instructions; and
a processor coupled to the memory and configured to execute the instructions to cause the apparatus to:
receive, from a mobility management network element, a positioning request message comprising current access types of a terminal device and connectivity states of the terminal device corresponding to the current access types, wherein the connectivity states comprise a first state of a first link between the terminal device and a first access point of a 3rd Generation Partnership Project (3GPP) access type and a second state of a second link between the terminal device and a second access point of a non-3GPP (N3GPP) access type, and wherein the current access types comprise the 3GPP access type and the N3GPP access type;
determine, based on the current access types and the connectivity states, a positioning method for the terminal device and an access type applicable to the positioning method, wherein the access type applicable to the positioning method is one of the current access types, and wherein a connectivity state corresponding to the access type applicable to the positioning method is a connected state; and
send the positioning method and the access type applicable to the positioning method to the mobility management network element.

12. The apparatus of claim 11, wherein before sending determining the positioning method and the access type, the processor is further configured to execute the instructions to cause the apparatus to send a request message to the mobility management network element requesting at least one of location information of the terminal device, access type information of the terminal device, or connectivity state information.

13. The apparatus of claim 11, wherein the first access point is a next generation radio access node, and wherein the second access point is an N3 GPP interworking function (N3IWF) network element.

14. The apparatus of claim 11, wherein the apparatus is a location management function (LMF) network element.

15. A communications system comprising:
a mobility management network element; and
a location management function (LMF) network element configured to:
receive, from the mobility management network element, a positioning request message comprising current access types of a terminal device and connectivity states of the terminal device corresponding to the current access types, wherein the connectivity states comprise a first state of a first link between the terminal device and a first access point of a 3rd Generation Partnership Project (3GPP) access type and a second state of a second link between the terminal device and a second access point of a non-3GPP (N3GPP) access type, and wherein the current access types comprise the 3GPP access type and the N3GPP access type;
determine, based on the current access types and the connectivity states, a positioning method for the terminal device and an access type applicable to the positioning method, wherein the access type applicable to the positioning method is one of the current access types, and wherein a connectivity state corresponding to the access type applicable to the positioning method is a connected state; and
send the positioning method and the access type applicable to the positioning method to the mobility management network element.

16. The communications system of claim 15, wherein before determining the positioning method and the access type, the LMF network element is further configured to send a request message to the mobility management network element requesting at least one of location information of the terminal device, access type information of the terminal device, or connectivity state information.

17. The communications system of claim 15, wherein the first access point is a next generation radio access node, and wherein the second access point is an N3GPP interworking function (N3IWF) network element.

18. A non-transitory computer program product comprising instructions that are stored on a computer-readable medium and that, when executed by a processor, cause an apparatus to:
receive, from a mobility management network element, a positioning request message comprising current access types of a terminal device and connectivity states of the terminal device corresponding to the current access types, wherein the connectivity states comprise a first state of a first link between the terminal device and a first access point of a 3rd Generation Partnership Project (3GPP) access type and a second state of a second link between the terminal device and a second access point of a non-3GPP (N3GPP) access type, wherein the current access types comprise the 3GPP access type and the N3GPP access type;

determine, based on the current access types and the connectivity states, a positioning method for the terminal device and an access type applicable to the positioning method, wherein the access type applicable to the positioning method is one of the current access types, and wherein a connectivity state corresponding to the access type applicable to the positioning method is a connected state; and send the positioning method and the access type applicable to the positioning method to the mobility management network element.

19. The non-transitory computer program product of claim 18, wherein the first access point is a next generation radio access node, and wherein the second access point is an N3GPP interworking function (N3IWF) network element.

20. The non-transitory computer program product of claim 18, wherein the instructions, when executed by the processor, further cause the apparatus to send, before determining the positioning method and the access type, a request message to the mobility management network element requesting at least one of location information of the terminal device, access type information of the terminal device, or connectivity state information.

* * * * *